US008914361B2

(12) United States Patent
Weissman et al.

(10) Patent No.: US 8,914,361 B2
(45) Date of Patent: Dec. 16, 2014

(54) METHODS AND SYSTEMS FOR DETERMINING A MEANING OF A DOCUMENT TO MATCH THE DOCUMENT TO CONTENT

(75) Inventors: Adam J. Weissman, Santa Monica, CA (US); Gilad Israel Elbaz, Santa Monica, CA (US)

(73) Assignee: Google Inc., Mountain View, CA (US)

( * ) Notice: Subject to any disclaimer, the term of this patent is extended or adjusted under 35 U.S.C. 154(b) by 529 days.

(21) Appl. No.: 10/689,903

(22) Filed: Oct. 21, 2003

(65) Prior Publication Data

US 2004/0243581 A1    Dec. 2, 2004

Related U.S. Application Data (63) Continuation-in-part of application No. 09/493,701, filed on Jan. 28, 2000, now Pat. No. 6,816,857, which is a continuation-in-part of application No. 09/431,760, filed on Nov. 1, 1999, now Pat. No. 6,453,315.

(60) Provisional application No. 60/155,667, filed on Sep. 22, 1999, provisional application No. 60/491,422, filed on Jul. 30, 2003.

(51) Int. Cl.
*G06F 7/00* (2006.01)
*G06F 17/30* (2006.01)

(52) U.S. Cl.
CPC .... *G06F 17/30731* (2013.01); *G06F 17/30616* (2013.01); *G06F 17/30864* (2013.01)
USPC ............ 707/729; 707/728; 707/730; 707/731

(58) Field of Classification Search
USPC ....................................... 707/10, 3
See application file for complete search history.

(56) References Cited

U.S. PATENT DOCUMENTS

| | | | |
|---|---|---|---|
| 4,839,853 A | 6/1989 | Deerwester et al. | |
| 5,325,298 A | 6/1994 | Gallant | |
| 5,404,506 A | 4/1995 | Fujisawa et al. | |
| 5,499,360 A | 3/1996 | Barbara et al. | |
| 5,619,709 A | 4/1997 | Caid et al. | |

(Continued)

FOREIGN PATENT DOCUMENTS

| | | |
|---|---|---|
| EP | 1160686 | 12/2001 |
| WO | WO 00/79436 | 12/2000 |

OTHER PUBLICATIONS

U.S. Appl. No. 09/493,701, filed Jan. 28, 2000, Weissman, et al.

(Continued)

*Primary Examiner* — Ajay Bhatia
*Assistant Examiner* — Cheryl M Shechtman
(74) *Attorney, Agent, or Firm* — Middleton Reutlinger (57) ABSTRACT

Systems and methods for determining a meaning of a document to match the document to content are described. In one aspect, a source article is accessed, a plurality of regions in the source article are identified, at least one local concept associated with each region is determined, the local concepts of each region are analyzed to identify any unrelated regions, the local concepts associated with any unrelated regions are eliminated to determine relevant concepts, the relevant concepts are analyzed to determine a source meaning for the source article, and the source meaning is matched with an item meaning associated with an item from a set of items.

29 Claims, 3 Drawing Sheets

(56) References Cited

U.S. PATENT DOCUMENTS

| | | | |
|---|---|---|---|
| 5,687,364 A * | 11/1997 | Saund et al. ............... 704/5 | |
| 5,724,571 A | 3/1998 | Woods | |
| 5,778,363 A | 7/1998 | Light | |
| 5,778,364 A | 7/1998 | Nelson | |
| 5,845,278 A | 12/1998 | Kirsch et al. | |
| 5,848,396 A | 12/1998 | Gerace | |
| 5,878,223 A | 3/1999 | Becker et al. | |
| 5,933,822 A | 8/1999 | Braden-Harder et al. | |
| 5,960,383 A | 9/1999 | Fleischer | |
| 6,044,375 A | 3/2000 | Shmueli et al. | |
| 6,067,552 A | 5/2000 | Yu | |
| 6,101,515 A | 8/2000 | Wical et al. | |
| 6,119,164 A | 9/2000 | Basche | |
| 6,134,532 A | 10/2000 | Lazarus et al. | |
| 6,240,408 B1 * | 5/2001 | Kaufman ............... 707/730 | |
| 6,269,361 B1 | 7/2001 | Davis et al. | |
| 6,289,342 B1 | 9/2001 | Lawrence | |
| 6,289,353 B1 | 9/2001 | Hazlehurst et al. | |
| 6,298,348 B1 | 10/2001 | Eldering | |
| 6,314,419 B1 | 11/2001 | Faisal | |
| 6,324,519 B1 | 11/2001 | Eldering | |
| 6,324,538 B1 * | 11/2001 | Wesinger et al. ............. 707/10 | |
| 6,421,675 B1 | 7/2002 | Ryan et al. | |
| 6,453,315 B1 | 9/2002 | Weissman et al. | |
| 6,473,730 B1 | 10/2002 | McKeown et al. | |
| 6,484,161 B1 * | 11/2002 | Chipalkatti et al. ............ 707/3 | |
| 6,594,658 B2 | 7/2003 | Woods | |
| 6,651,058 B1 | 11/2003 | Sundaresan et al. | |
| 6,763,349 B1 | 7/2004 | Sacco | |
| 7,024,624 B2 | 4/2006 | Hintz | |
| 2001/0049674 A1 | 12/2001 | Talib et al. | |
| 2002/0099700 A1 | 7/2002 | Li | |
| 2002/0165849 A1 | 11/2002 | Singh et al. | |
| 2002/0174101 A1 | 11/2002 | Fernley et al. | |
| 2003/0126235 A1 | 7/2003 | Chandrasekar et al. | |

OTHER PUBLICATIONS

"Applied Semantics Launches Contextual Targeting Pay-For-Performance Ad Serving Solution", Applied Semantics—Press Release, Oct. 21, 2002, pp. 1-2, http://www.appliedsemantics.com/ne/ne_pr_102102.html.

"Applied Semantics Launches News Series to Power Publishing", Applied Semantics, Inc.—Press Release, Aug. 13, 2002, pp. 1-2, http://www.appliedsemantics.com/ne/ne_pr_081302.html.

"Applied Semantics News Series," pp. 1-4, brochure, no date.

Chi et al. "Context Query in Information Retrieval", Proceedings of the 14$^{th}$ IEEE International Conference on Tools with Artificial Intelligence, IEEE Comp. Soc, vol. Conf. 14, Nov. 2002, pp. 101-106.

"CIRCA Technology Overview," Applied Semantics White Paper, Jul. 2001, pp. 1-10.

"Convera—Products: RetrievalWare," printed Oct. 30, 2003, http://www.convera.com/products/rw_precisions.asp.

Fellbaum, C., ed. "WordNet: An Electronic Lexical Database", Cambridge: The MIT Press, Mar. 1998, pp. 117-127, 285-303. P325.5. D38W67 1998.

Geller, M., "Quigo Signs Deal with Overture", *MediaDailyNews*, Aug. 13, 2003, pp. 1-3, http://www.mediapost.com/dtls_dsp_news.cfm?newsID=215196.

Koll, M.B., "Information Retrieval Theory and Design Based on a Model of the User's Concept Relations", Proceedings of the 3$^{rd}$ Annual ACM Conference on Research and Development in Information Retrieval, 1980, pp. 77-93.

"Ontology Usage and Applications", Applied Semantics Technical White Paper, Jul. 2001, pp. 1-15.

"Powerful Revenue Solutions for Online Publishers", Applied Semantics AdSense, pp. 1-2, brochure, no date.

Tengi, R.I., "Design and Implementation of the WordNet Lexical Database and Searching Software", in *WordNet: An Electronic Lexical Database*, Fellbaum C. ed., Cambridge: The MIT Press, Mar. 1998, pp. 105-127.

"Verity Introduces Customizable Industry and Enterprise Taxonomies", Verity, Nov. 17, 2003, pp. 1-2.

Voorhees, E.M., "Query Expansion Using Lexical-Semantic Relations", Proceedings of the 17$^{th}$ Annual ACM Conference on Research and Development in Information Retrieval, Aug. 1994, pp. 61-69.

Correspondence from Australian Patent Office dated Aug. 5, 2009, pp. 1-3.

Office Action issued in Canadian Patent Application No. 2,534,062 on Feb. 7, 2012.

International Search Report—PCT/US04/023827, Dec. 21, 2004, Google Inc.

Lin, Shian-Hua et al. Discovering Informative Content Blocks from Web Documents, Proceedings of the ACM SIGKDD International Conference on Knowledge Discovery and Data Mining, Jul. 23, 2002-Jul. 26, 2002, pp. 588-593, Edmonton, Alberta Canada.

International Preliminary Report on Patentability, Jan. 30, 2006, Google Inc.

Kerschberg, et al. "A Semantic Taxonomy-Based Personalizable Meta-Search Agent," Conference Proceedings Article, vol. 1. Dec. 3, 2001.

Voss, et a., "Concepts as Knowledge Handles in Colllaborative Document Management," Enabling Technologies: Infrastructure for Collaborative Enterprises, 1999.

Apted, et al., "Visualisation of Ontological Inferences for User Control of Personal Web Agents," Proceedings of the Seventh International Conference on Information Visualization (IV '03).

* cited by examiner

METHODS AND SYSTEMS FOR DETERMINING A MEANING OF A DOCUMENT TO MATCH THE DOCUMENT TO CONTENT

CROSS-REFERENCE TO RELATED APPLICATION

This application is a continuation-in-part of U.S. patent application Ser. No. 09/493,701 filed Jan. 28, 2000 entitled "Meaning-Based Advertising and Relevance Determination," which is a continuation-in-part of U.S. patent application Ser. No. 09/431,760 (now U.S. Pat. No. 6,453,315) filed Nov. 1, 1999 entitled "Meaning-Based Information Organization and Retrieval," which claims priority to U.S. Provisional Patent Application Ser. No. 60/155,667 filed Sep. 22, 1999, all of which are hereby incorporated in their entirety by this reference, and this application claims priority to U.S. Provisional Patent Application Ser. No. 60/491,422 filed Jul. 30, 2003 entitled "Systems and Methods of Organizing and Retrieving Information Based on Meaning," which is hereby incorporated in its entirety by this reference.

FIELD OF THE INVENTION

The invention generally relates to documents. More particularly, the invention relates to methods and systems for determining a meaning of a document to match the document to content.

BACKGROUND OF THE INVENTION

Documents, such as web pages, can be matched to other content on the Internet, for example. Documents include, for example, web pages of various formats, such as HTML, XML, XHTML; Portable Document Format (PDF) files; and word processor and application program document files.

One example of the matching of documents to content is in Internet advertising. For example, a publisher of a website may allow advertising for a fee on its web pages. When the publisher desires to display an advertisement on a web page to a user, a facilitator can provide an advertisement to the publisher to display on the web page. The facilitator can select the advertisement by a variety of factors, such as demographic information about the user, the category of the web page, for example, sports or entertainment, or the content of the web page. The facilitator can also match the content of the web page to a knowledge item, such as a keyword, from a list of keywords. An advertisement associated with the matched keyword can then be displayed on the web page. A user may manipulate a mouse or another input device and "click" on the advertisement to view a web page on the advertiser's website that offers goods or services for sale.

In another example of Internet advertising, the actual matched keywords are displayed on a publisher's web page in a Related Links or similar section. Similar to the example above, the content of the web page is matched to the one or more keywords, which are then displayed in the Related Links section, for example. When a user clicks on a particular keyword, the user can be directed to a search results page that may contain a mixture of advertisements and regular search results. Advertisers bid on the keyword to have their advertisements appear on such a search results page for the keyword. A user may manipulate a mouse or another input device and "click" on the advertisement to view a web page on the advertiser's website that offers goods or services for sale.

Advertisers desire that the content of the web page closely relate to the advertisement, because a user viewing the web page is more likely to click on the advertisement and purchase the goods or services being offered if they are highly relevant to what the user is reading on the web page. The publisher of the web page also wants the content of the advertisement to match the content of the web page, because the publisher is often compensated if the user clicks on the advertisement and a mismatch could be offensive to either the advertiser or the publisher in the case of sensitive content.

Documents, such as web pages, can consist of several regions, such as, frames in the case of web pages. Some of the regions can be irrelevant to the main content of the document. Therefore, the content of the irrelevant regions can dilute the content of the overall document with irrelevant subject matter. It is, therefore, desirable to analyze a source document for the most relevant regions when determining a meaning of the source document in order to match the document to content.

SUMMARY

Embodiments of the present invention comprise systems and methods that determine the meaning of documents to match the document to content. One aspect of an embodiment of the present invention comprises accessing a source article, identifying a plurality of regions in the source article, determining at least one local concept associated with each region, analyzing the local concepts of each region to identify any unrelated regions, eliminating the local concepts associated with any unrelated regions to determine relevant concepts, analyzing the relevant concepts to determine a source meaning for the source article, and matching the source meaning with an item meaning associated with an item from a set of items. The item can be content itself or may be associated with content. In one embodiment, the invention further comprises displaying the matched item on the source article. In another embodiment, the invention further comprises displaying content associated with the item on the source article. Additional aspects of the present invention are directed to computer systems and computer-readable media having features relating to the foregoing aspects.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION OF SPECIFIC EMBODIMENTS

The present invention comprises methods and systems for determining the meaning of a document to match the document to content. Reference will now be made in detail to exemplary embodiments of the invention as illustrated in the text and accompanying drawings. The same reference numbers are used throughout the drawings and the following description to refer to the same or like parts.

Figure 1:
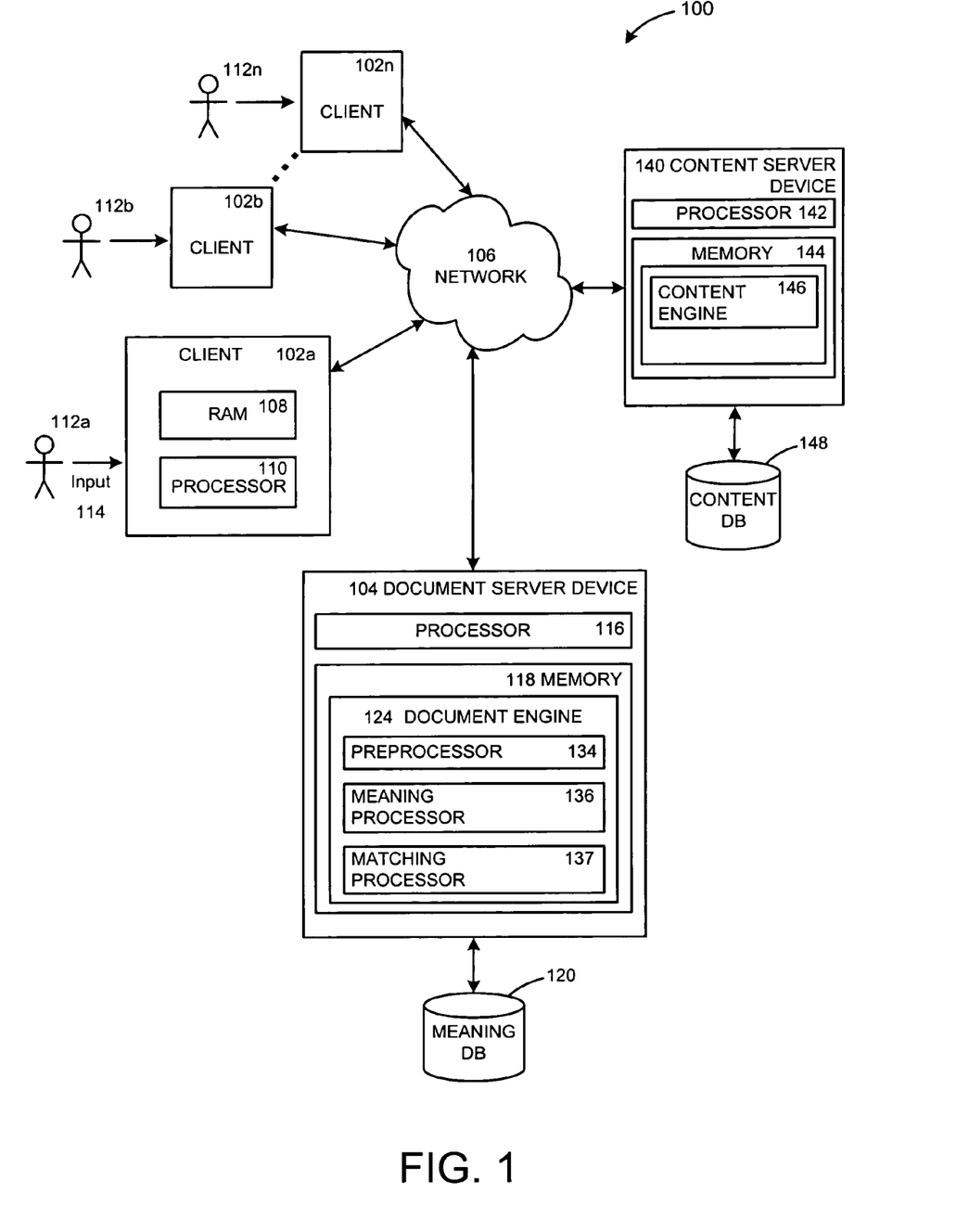
FIG. 1 illustrates a block diagram of a system in accordance with one embodiment of the present invention.

Various systems in accordance with the present invention may be constructed. FIG. 1 is a diagram illustrating an exemplary system in which exemplary embodiments of the present invention may operate. The present invention may operate, and be embodied in, other systems as well.

The system 100 shown in FIG. 1 includes multiple client devices 102a-n, server devices 104, 140 and a network 106. The network 106 shown includes the Internet. In other embodiments, other networks, such as an intranet may be used. Moreover, methods according to the present invention may operate in a single computer. The client devices 102a-n shown each include a computer-readable medium, such as a random access memory (RAM) 108, in the embodiment shown coupled to a processor 110. The processor 110 executes a set of computer-executable program instructions stored in memory 108. Such processors may include a microprocessor, an ASIC, and state machines. Such processors include, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor in communication with a touch-sensitive input device, with computer-readable instructions. Other examples of suitable media include, but are not limited to, a floppy disk, CD-ROM, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any computer-programming language, including, for example, C, C++, C#, Visual Basic, Java, and JavaScript.

Client devices 102a-n may also include a number of external or internal devices such as a mouse, a CD-ROM, a keyboard, a display, or other input or output devices. Examples of client devices 102a-n are personal computers, digital assistants, personal digital assistants, cellular phones, mobile phones, smart phones, pagers, digital tablets, laptop computers, a processor-based device and similar types of systems and devices. In general, a client device 102a-n may be any type of processor-based platform connected to a network 106 and that interacts with one or more application programs. The client devices 102a-n shown include personal computers executing a browser application program such as Internet Explorer®, version 6.0 from Microsoft Corporation, Netscape Navigator™, version 7.1 from Netscape Communications Corporation, and Safari™, version 1.0 from Apple Computer. Through the client devices 102a-n, users 112a-n can communicate over the network 106 with each other and with other systems and devices coupled to the network 106.

As shown in FIG. 1, server devices 104, 140 are also coupled to the network 106. The document server device 104 shown includes a server executing a document engine application program. The content server device 140 shown includes a server executing a content engine application program. The system 100 can also include multiple other server devices. Similar to the client devices 102a-n, the server devices 104, 140 shown each include a processor 116, 142 coupled to a computer readable memory 118, 144. Each server device 104, 140 is depicted as a single computer system, but may be implemented as a network of computer processors. Examples of server devices 104, 140 are servers, mainframe computers, networked computers, a processor-based device and similar types of systems and devices. Client processors 110 and server processors 116, 142 can be any of a number of well known computer processors, such as processors from Intel Corporation of Santa Clara, Calif. and Motorola Corporation of Schaumburg, Ill.

Memory 118 of the document server device 104 contains a document engine application program, also known as a document engine 124. The document engine 124 determines a meaning for a source article and matches the source article to an item, such as, another article or a knowledge item. The item can be the content itself or can be associated with the content. The source articles can be received from other devices connected to the network 106. Articles include, documents, for example, web pages of various formats, such as HTML, XML, XHTML, Portable Document Format (PDF) files, and word processor, database, and application program document files, audio, video, or any other information of any type whatsoever made available on a network (such as the Internet), a personal computer, or other computing or storage means. The embodiments described herein are described generally in relation to documents, but embodiments may operate on any type of article. Knowledge items are anything physical or non-physical that can be represented through symbols and can be, for example, keywords, nodes, categories, people, concepts, products, phrases, documents, and other units of knowledge. Knowledge items can take any form, for example, a single word, a term, a short phrase, a document, or some other structured or unstructured information. The embodiments described herein are described generally in relation to keywords, but embodiments may operate on any type of knowledge item.

The document engine 124 shown includes a preprocessor 134, a meaning processor 136, and a matching processor 137. In the embodiment shown, each comprises computer code residing in the memory 118. The document engine 124 receives a request for content to be placed on a source document. Such request can be received from a device connected to the network 106. The content can include documents, such as web pages and advertisements, and knowledge items such as keywords. The preprocessor 134 receives the source document and analyzes the source document to determine concepts contained in the document and regions in the document. A concept can be defined using a cluster or set of words or terms associated with it, where the words or terms can be, for example, synonyms. A concept can also be defined by various other information, such as, for example, relationships to related concepts, the strength of relationships to related concepts, parts of speech, common usage, frequency of usage, the breadth of the concept and other statistics about concept usage in language. The meaning processor 136 analyzes the concepts and the regions to eliminate regions unrelated to the main concepts of the source document. The meaning processor 136 then determines a source meaning for the source document from the remaining regions. The matching processor 137 matches the source meaning of the source document with a meaning of an item from a set of items.

Memory 144 of content server device 140 contains a content engine application program, also known as a content engine 146. In the embodiment shown, the content engine comprises computer code residing in memory 144. The content engine 146 receives the matched item from the document server device 104 and places the item or content associated with the item on the source document. In one embodiment, the content engine 146 receives a matched keyword from the matching engine 137 and associates a document, such as an advertisement, with it. The advertisement is then sent to a requester's website and placed in the source document, such as, a frame on a web page, for example.

Document server device 104 also provides access to other storage elements, such as a meaning storage element, in the example shown a meaning database 120. The meaning database can be used to store meanings associated with source documents. Content server device 140 also provides access to other storage elements, such as a content storage element, in the example shown a content database 148. The content database can be used to store items and content associated with the items, such as keywords and associated advertisements. Data storage elements may include any one or combination of methods for storing data, including without limitation, arrays, hashtables, lists, and pairs. Other similar types of data storage devices can be accessed by the server devices 104 and 140.

It should be noted that the present invention may comprise systems having different architecture than that which is shown in FIG. 1. For example, in some systems according to the present invention, the preprocessor 134 and meaning processor 136 may not be part of the document engine 124, and may carry out their operations offline. In one embodiment, the meaning of a document is determined periodically as the document engine crawls documents, such as web pages. In another embodiment, the meaning of a document is determined when a request for content to be placed on the document is received. The system 100 shown in FIG. 1 is merely exemplary, and is used to explain the exemplary methods shown in FIGS. 2-3.

In the exemplary embodiment shown in FIG. 1, a user 112a can access a document on a device connected to the network 106, such as a web page on a website. For example, the user 112a may access a web page containing a story about fly fishing for salmon in Washington on a news website. In this example, the web page contains four regions, a title section containing the title of the story, the author and a one sentence summary of the story, a main story section containing the text and pictures of the story, a banner ad relating to selling automobiles, and a link section containing links to other web pages in the website, such as national news, weather and sports. The owner of the news website may desire to sell advertising space on the source web page and thus, sends a request to the document server 104 via the network 106 for an item, such as an advertisement, to be displayed on the web page.

In order to match the source web page with an item, the meaning of the source web page is first determined. The document engine 124 accesses the source web page and may receive the web page. The source meaning of the web page may have previously been determined and may be stored in the meaning database 120. If the source meaning has previously been determined, then the document engine 124 retrieves the source meaning.

If the source meaning of the web page has not been determined, the preprocessor 134 first identifies concepts contained in the web page and regions contained in the web page. For example, the preprocessor may determine that the web page has four regions corresponding to the title region, the story region, the banner ad region and the links region and that the web page contains concepts relating to salmon, fly fishing, Washington, automobiles, news, weather, and sports. The regions do not necessarily correspond to frames on a web page. The meaning engine then determines local concepts for each region and ranks all of the local concepts. A variety of weighing factors can be used to rank the concepts, such as, the importance of the region, the importance of the concept, the frequency of the concept, the number of regions the concept appears in, and the breadth of the concept, for example.

The meaning engine 136 then identifies regions that are unrelated to the majority of the concepts and eliminates the local concepts associated with them. In the example, the banner region and the link region do not contain concepts particularly relevant to the story and thus, the concepts related to these regions are eliminated. The meaning engine then determines a source based on the remaining concepts. The meaning could be a vector of weighted concepts. For example, the meaning could be salmon (40%), fly fishing (40%) and Washington (20%).

This meaning can be matched to an item by the matching processor 137. The items can include, documents, such as web pages and advertisements, and knowledge items, such as keywords, and can be received from the content server device 140. The items can be stored in the content database 148. For example, if the items are keywords, such as, fly fishing, backpacking, CDs, and travel the matching engine compares the source meaning with meanings associated with the keywords to determine a match. Biasing factors, such as cost per click data associated with each keyword, can be used. For example, if the meaning of the keyword fly fishing is a closer match than the meaning of the keyword travel, but the advertiser who has currently bought the keyword travel has a higher cost per click rate, the meaning engine may match the source meaning with the keyword travel. Content filters can also be used to filter out any adult content or sensitive content.

The matched keyword can be received by the content server device 140. The content engine 146 associates an advertisement with the matched keyword and displays it on the source web page. For example, if the travel keyword was matched the content engine would display on the source web page containing the story about fly fishing for salmon in Washington the advertisement associated with the keyword travel. If the user 112a points his input device at the advertisement and clicks on it, the user may be directed to a web page associated with the advertisement.

Various methods in accordance with the present invention may be carried out. One exemplary method according to the present invention comprises accessing a source article, identifying a plurality of regions in the source article, determining at least one local concept associated with each region, analyzing the local concepts of each region to identify any unrelated regions, eliminating the local concepts associated with any unrelated regions to determine relevant concepts, analyzing the relevant concepts to determine a source meaning for the source article, and matching the source meaning with an item meaning associated with an item from a set of items. Biasing factors can be used to match the source meaning with an item meaning. The source meaning can be a vector of weighted concepts.

In some embodiments, the method further comprises displaying the matched item on the source article. In these embodiments, the source article can be a web page and the matched item can be a keyword. Alternatively, the source article can be a web page and the matched item can be an advertisement.

In some embodiments, the method further comprises displaying content associated with the matched item on the source article. In these embodiments, the source article can be a web page, the matched item can be a keyword and the associated content can be an advertisement. Further, the source article can be a first web page, the matched item can be a second web page and the associated content can be an advertisement. Alternatively, the source article can be a first web page, the matched item can be a second web page and the associated content can be a link to the second web page.

In some embodiments, determining at least one local concept involves determining a score for each local concept in each region. The local concepts in each region with the highest scores are most relevant local concepts. Further, identifying unrelated regions involves first determining a revised score for each local concept. Next, a ranked global list is determined containing all local concepts based on the revised scores. Local concepts whose combined revised score contributes less than a predetermined amount of a total score for the global list are removed to produce a resulting list. Then, unrelated regions with no most relevant local concepts on the resulting list are determined. Local concepts associated with the unrelated regions are then removed from the resulting list to produce a list of relevant concepts. Moreover, a source meaning is determined by normalizing the revised scores for the relevant concepts.

Another exemplary method according to the present invention comprises accessing a source article, identifying at least a first content region and a second content region in the source article, determining at least a first local concept associated with the first content region and determining at least a second local concept associated with the second content region, matching the first content region with a first item from a set of items based at least in part on the first local concept, and matching the second content region with a second item from the set of items based at least in part on the second local concept.

Figure 2:
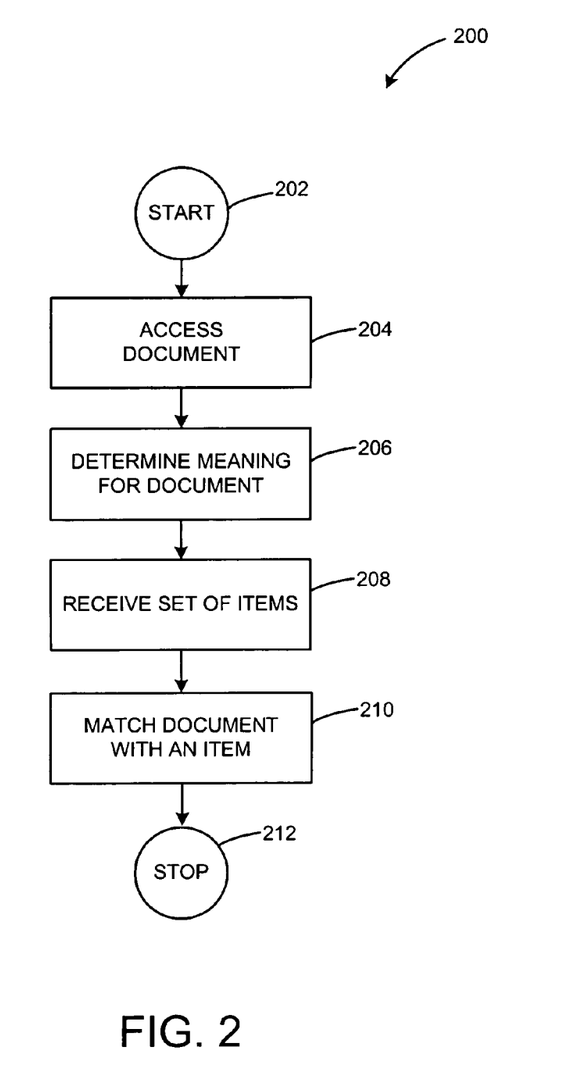
FIG. 2 illustrates a flow diagram of a method in accordance with one embodiment of the present invention.
Figure 3:
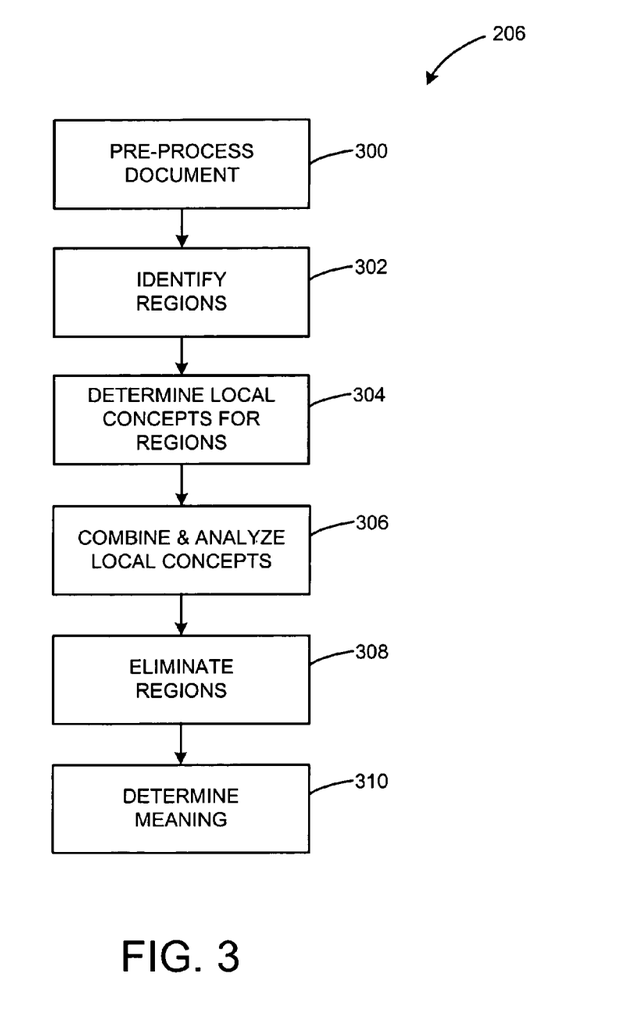
FIG. 3 illustrates a flow diagram of a subroutine of the method shown in FIG. 2.

FIGS. 2-3 illustrate an exemplary method 200 in accordance with the present invention in detail. This exemplary method is provided by way of example, as there are a variety of ways to carry out methods according to the present invention. The method 200 shown in FIG. 2 can be executed or otherwise performed by any of various systems. The method 200 is described below as carried out by the system 100 shown in FIG. 1 by way of example, and various elements of the system 100 are referenced in explaining the example method of FIGS. 2-3. The method 200 shown provides a determination of the meaning of a source document to match the source document to an item.

Each block shown in FIGS. 2-3 represents one or more steps carried out in the exemplary method 200. Referring to FIG. 2 in block 202, the example method 200 begins. Block 202 is followed by block 204 in which a document is accessed. The document can, for example, be accessed and received from a device on the network 106 or other sources.

Block 204 is followed by block 206, in which a meaning for the source document is determined. In the embodiment shown, a meaning is determined for the source document by separating the document into regions, eliminating unhelpful regions, and analyzing concepts contained in the remaining regions of the document. For example, in the embodiment shown, the preprocessor 134 initially determines concepts contained in the source document and determines regions in the document. The meaning processor 136 ranks the concepts and removes regions and associated concepts unrelated to the majority of the concepts. From the remaining concepts, the meaning processor 136 determines a source meaning for the document.

FIG. 3 illustrates a subroutine 206 for carrying out the method 200 shown in FIG. 2. The subroutine 206 provides a meaning for the source document received. An example of the subroutine is as follows.

The subroutine begins at block 300. At block 300, the source document is preprocessed to determine concepts contained in the document. This can be accomplished by natural language and text processing to decipher the document into words and then aligning the words with concepts. In one embodiment, for example, tokens corresponding to words are first determined by natural language and text processing and matched to tokens contained in a semantic network of interconnected meanings. From the matched tokens, terms are then determined from the semantic network. Concepts for the determined terms are then assigned and given a probability of being related to the terms.

Block 300 is followed by block 302, in which regions of the document are identified. Regions of the document can be determined, for example, based on certain heuristics, including formatting information. For example, for a source document that is a web page that comprises HTML labels, the labels can be used to aid in identifying regions. For example, text within <title> . . . </title> tags can be marked as text in a title region. Text in a paragraph where more than seventy percent of the text is within tags <a> . . . </a> can be marked as in a link region. The structure of the text can also be used to aid in identifying the regions. For example, text in short paragraphs or columns in a table, without the structure of a sentence, such as, for example, without a verb, too few words, or no punctuation to end the sentence, can be marked as being in a list region. Text in long sentences, with verbs and punctuation, can be marked as part of a text region. When the type of region changes, a new region can be created starting with the text marked with the new type. In one embodiment, if a text region gets more than twenty percent of the document, it can be broken in smaller pieces.

Block 302 is followed by block 304, in which the most relevant concepts for each region are determined. In the embodiment shown, the meaning processor 136 processes the concepts identified for each region to come up with a smaller set of local concepts for each region. Relationships between concepts, the frequency of the occurrence of the concept within the region and the breadth of the concept can be used in the determination of local concepts.

In one embodiment, for each region, every concept is put in a list. The concepts are ranked on the list by determining a score for each concept using a variety of factors. For example, if a first concept has a strong connection to other concepts, this is used to boost the score of the first concept and its related concepts. This effect is tempered by the frequency of occurrence of the first concept and the focus (or breadth) of the first concept to diminish very common concepts and concepts that are broader in meaning. Concepts whose frequencies are above a certain threshold can be filtered out. Perceived importance of the concept can also impact the score of the concept. Importance of a concept can be determined earlier in processing by, for example, whether words that caused the inclusion of the concept are marked in bold. After the concepts for each region are ranked, the least relevant concepts can be removed. This can be done by choosing a set number of the highest ranking concepts or removing concepts having a ranking score below a certain score.

Block 304 is followed by block 306, in which all of the local concepts for each region are combined and analyzed. In the embodiment shown, the meaning processor 136 receives all local concepts for each region and creates a ranked global list of all local concepts by, for example, a score for each local concept. Biasing factors such as the importance of each region can be used to determine the score. The importance of each region can be determined by the type of region and the size of a region. For example, a title region can be considered more important than a links region and concepts appearing in the title region can be given more weight than concepts in the links region. Additional weight can be given to concepts that appear in more than one region. For example, duplicates of concepts can be merged and their scores added together. This global list can then be sorted, and the trailing concepts contributing to less than twenty percent, for example, of the sum of the scores can be removed to produce a resulting global list of local concepts.

Block 306 is followed by block 308, in which regions whose main concepts relate to unrelated concepts are eliminated. In the embodiment shown, the meaning processor 136 determines unrelated regions, regions containing concepts not related to the majority of concepts and eliminates them. It should be understood that "related" and "unrelated" need not be determined using absolute criteria. "Related" is an indication of a relatively high degree of relationship, and/or a predetermined degree of relationship. "Unrelated" is an indication of a relatively low degree of relationship, and/or a predetermined degree of relationship. By eliminating unrelated regions, the associated unrelated concepts are eliminated. For example, if the source document is a web page made up of various frames, some of the frames will relate to advertisements or links to other pages in the website and, thus, will be unrelated to the main meaning of the web page.

In one embodiment, for example, the resulting global list determined in block 306 can be an approximation of the meaning of the document and can be used to remove the regions that are not related to the meaning of the document. The meaning processor 136 can, for each region, determine if the most representative local concepts for the region are not present in the resulting global list. If the most representative local concepts for a region are not on the list, the region can be marked as irrelevant. The most representative local concepts for a region can be the concepts with the highest scores for the region as determined in block 304, for example.

Block 308 is followed by block 310, in which the meaning of the source document is determined. In the embodiment shown, the meaning processor 136 recalculates the representativeness of the local concepts for the regions not eliminated to create a relevant list of concepts. These local concepts on the relevant list can then be culled to a fixed number of concepts to provide a meaning list and then normalized to provide a source meaning. For example, a meaning list can be created using only concepts contained in relevant regions and all except the twenty-five highest scoring concepts are removed from the new list. The scores of the highest scoring concepts can be normalized to provide a source meaning. In this example, the source meaning can be a weighted vector of relevant concepts.

Referring again to FIG. 2, block 206 is followed by block 208, in which a set of items is received. The items can be received, for example, by the matching processor 137 from the content server device 140. The items can include for example knowledge items, such as, keywords, and documents, such as, advertisements and web pages. Each item received can have a meaning associated with it. For keyword meanings, for example, these can be determined through use of information associated with the keyword as described in related U.S. patent application Ser. No. 10/689,903, entitled "Methods and Systems for Understanding a Meaning of a Knowledge Item Using Information Associated with the Knowledge Item", which is hereby incorporated by reference. The meaning of a document can be determined in the same manner as described with respect to FIG. 3, for example.

Block 208 is followed by block 210, in which the source document is matched to an item. Biasing factors can be used in the matching process. In one embodiment, for example, the source meaning is matched with a keyword meaning associated with a keyword from a set of keywords. The matching engine compares the source meaning to the keyword meanings and uses biasing factors, such as cost per click data associated with the keywords to determine a match. This matched keyword can then be sent to the content server device 140. The content engine 146 can match the matched keyword with its associated advertisement and display the advertisement on the source document. Alternatively, the content engine can display the keyword itself on the source document. In another embodiment meanings for advertisements are matched to the source meaning. In this embodiment, the content engine 146 can cause the display of the matched advertisement on the source document. In another embodiment, meanings for web pages are matched to the source meaning. In this embodiment, the content engine 146 can cause the display of an advertisement associated with the web page. Block 210 is followed by block 212, in which the method ends.

In one embodiment, after the source document is accessed, the source document is analyzed by the preprocessor 134 to determine content regions of the source document. Content regions can be regions containing a substantial amount of text, such as, for example, a text region or a link region, or can be a region of relative importance, such as, for example, the title region. These regions can be determined through use of heuristics as described above. The preprocessor 134 can also identify concepts located in each content region as described above. These concepts can be used by the meaning processor 136 to determine a meaning for each content region. The matching processor 137 can match the meaning of each content region with a keyword. The content engine 146 can match the matched keyword with its associated advertisement and display the advertisement on the source document. Alternatively, the content engine can display the keyword itself on the source document. In another embodiment, meanings for advertisements are matched to the region meanings. In this embodiment, the content engine 146 can cause the display of the matched advertisement on the source document. In another embodiment, meanings for web pages are matched to the region meanings. In this embodiment, the content engine 146 can cause the display of an advertisement associated with the web page. In one embodiment, the advertisements or keywords are displayed in the content region for which they are matched.

While the above description contains many specifics, these specifics should not be construed as limitations on the scope of the invention, but merely as exemplifications of the disclosed embodiments. Those skilled in the art will envision many other possible variations that are within the scope of the invention.

That which is claimed:

1. A method for determining a source meaning for a web page document, the method performed by a document server implemented as a network of computer processors or as a single computer system, the document server executing a document engine, the method comprising:
   receiving a web page document;
   identifying, based on formatting information of the web page document, a collection of different regions contained within the webpage document, that would be displayed to a user visiting said web page document, wherein the regions contained within the webpage document contain content between opening and closing HTML or XML tags;
   determining concepts expressed in each of the previously identified different regions in the collection,
   wherein determining the concepts expressed in each of the different regions comprises
      identifying words contained within each of the different regions and aligning the words with concepts;

determining scores for the concepts expressed in each of the different regions, wherein the score for a concept expressed in at least one of the different regions is based on a size of the at least one of the different regions;

creating a ranked global list of concepts based at least in part on said scores for said concepts expressed in each of said different regions;

removing unrelated concepts from said global list of concepts;

determining the source meaning for the web page document, wherein determining the source meaning includes excluding the unrelated concepts from the determination of the source meaning and wherein the source meaning is a vector of said determined concepts expressed in the web page document; and making the previously determined source meaning available.

2. The method of claim 1, wherein identifying the collection of different regions in the document comprises identifying frames in the web page document.

3. The method of claim 1, wherein identifying the collection of different regions in the web page document comprises identifying the different regions based on markup in the web page document.

4. The method of claim 1, wherein determining concepts comprises identifying collections of related words in each of the different regions in the collection.

5. The method of claim 1, further comprising:
based on the concepts expressed in each of the different regions in the collection, selecting one or more advertisements; and
making the web page document and the selected advertisements available for output.

6. A computer-implemented method comprising:
receiving, by a computing system, a source web page document;
identifying, by the computing system based on formatting information of the source web page document, a plurality of regions contained within the source webpage document, that would be displayed to a user visiting said source web page document, wherein the regions contained within the source webpage document contain content between opening and closing HTML or XML tags;
determining, by the computing system, at least one local concept expressed within each previously identified region, wherein determining the at least one local concept comprises identifying words in the document and aligning the words with concepts, wherein said at least one local concept expressed within said each previously identified region is a concept expressed by two or more words contained within the region;
determining a score for a local concept expressed in each previously-identified region, wherein the score is based on an importance associated with the previously-identified region;
analyzing, by the computing system, the previously determined at least one local concept of each region to identify and eliminate from consideration one or more local concepts that are unrelated to local concepts of other of said previously identified regions by creating a ranked global list of all of said local concepts;
analyzing, by the computing system, the previously identified regions to identify and eliminate from consideration one or more regions that are unrelated to other previously identified regions by comparing a ranked list of local concepts for each of said previously identified regions to said global list;
determining, by the computing system, a source meaning for the source web page document, wherein the source meaning for the source web page document is a weighted vector of said previously determined local concepts expressed in the source web page document that remain after the eliminations; and
matching, by the computing system, the source web page document with an item selected from a set of items by comparing the previously determined source meaning and a meaning of the item.

7. The computer-implemented method of claim 6, further comprising causing the matched item to be displayed on the source web page document at a display device.

8. The computer-implemented method of claim 7, wherein the matched item comprises a keyword.

9. The computer-implemented method of claim 7, wherein the matched item comprises an advertisement.

10. The computer-implemented method of claim 6, further comprising displaying content associated with the matched item on the source web page document.

11. The computer-implemented method of claim 10, wherein:
the matched item comprises a keyword; and
the associated content comprises an advertisement.

12. The computer-implemented method of claim 10, wherein:
the matched item comprises a second web page; and
the associated content comprises an advertisement.

13. The computer-implemented method of claim 10, wherein:
the matched item comprises a second web page; and
the associated content comprises a link to the second web page.

14. The computer-implemented method of claim 6, wherein matching the source web page document with the item comprises matching the source web page document with the item using a biasing factor.

15. The computer-implemented method of claim 6, wherein:
determining at least one local concept comprises determining a score for each local concept; and
the local concept with the highest score in each region comprises a most relevant local concept for that region.

16. The computer-implemented method of claim 15, wherein identifying unrelated concepts comprise:
determining a revised score for each local concept;
determining said ranked global list of all local concepts based on the revised scores;
removing local concepts whose combined revised score contributes less than a predetermined amount of a total score of the global list to produce a resulting list;
identifying regions without a most relevant local concept on the resulting list; and
removing local concepts expressed in the identified regions without a most relevant local concept from the resulting list to produce a list of relevant concepts.

17. The computer-implemented method of claim 16, wherein determining the source meaning comprises normalizing the revised scores for the relevant concepts.

18. The computer-implemented method of claim 6, wherein identifying the plurality of regions comprises identifying content between said opening and closing HTML or XML tags as a region.

19. The computer-implemented method of claim 6, wherein determining at least one local concept comprises determining a score for at least one local concept based at least in part on a size of a region of the source web page document in which the at least one local concept is found.

20. The computer-implemented method of claim 6, wherein identifying the plurality of regions comprises dividing content that constitutes more than a predetermined percentage of the document, and that would otherwise be identifiable as a region, into multiple regions.

21. A non-transitory computer-readable medium storing program code operable to cause one or more computers to perform operations comprising:
    receiving a source web page document;
    identifying, by a preprocessor based on formatting information of the source web page document, a plurality of regions contained within the source webpage document, that would be displayed to a user visiting said source web page document, wherein the regions contained within the source webpage document contain content between opening and closing HTML or XML tags;
    determining at least one local concept expressed in each previously identified region, wherein determining the at least one local concept comprises identifying words in the document and aligning the words with concepts, wherein said at least one local concept expressed in the previously identified region is expressed by two or more words in the region;
    determining a score for a local concept expressed in each previously-identified region, wherein the score is based on a size of, or an importance associated with, the previously-identified region;
    analyzing the previously determined at least one local concept of each region to identify and eliminate from consideration one or more local concepts that are unrelated to local concepts of other of said previously identified regions by creating a ranked global list of all of said local concepts;
    analyzing the previously identified regions to identify and eliminate from consideration one or more regions that are unrelated to regions by comparing a ranked list of local concepts for each of said previously identified regions to said global list;
    determining a source meaning for the source web page document, wherein the source meaning for the source web page document is a weighted vector of said previously determined local concepts expressed in the source web page document that remain after the eliminations; and
    matching the source web page document with an item selected from a set of items by comparing the previously determined source meaning and a meaning of the item.

22. The non-transitory computer-readable medium of claim 21, wherein:
    the matched item comprises a keyword; and
    the associated content comprises an advertisement.

23. The non-transitory computer-readable medium of claim 21, wherein:
    the matched item comprises a second web page; and
    the associated content comprises an advertisement.

24. The non-transitory computer-readable medium of claim 21, wherein:
    the matched item comprises a second web page; and
    the associated content comprises a link to the second web page.

25. The non-transitory computer-readable medium of claim 21, wherein matching the source web page document with the item comprises matching the source web page document with the item using a biasing factor.

26. The non-transitory computer-readable medium of claim 21, wherein eliminating said unrelated concepts comprises ranking said previously determined local concepts in said global list using biasing factors.

27. The non-transitory computer-readable medium of claim 21, wherein:
    determining at least one local concept comprises determining a score for each local concept; and
    the local concept with the highest score in each region comprises a most relevant local concept for that region.

28. The non-transitory computer-readable medium of claim 27, wherein identifying unrelated concepts comprises:
    determining a revised score for each local concept;
    determining said ranked global list of all local concepts based on the revised scores;
    removing local concepts whose combined revised score contributes less than a predetermined amount of a total score of the global list to produce a resulting list;
    identifying unrelated regions without a most relevant local concept on the resulting list; and
    removing local concepts expressed in the unrelated regions from the resulting list to produce a list of relevant concepts.

29. The non-transitory computer-readable medium of claim 28, wherein determining the source meaning comprises normalizing the revised scores for the relevant concepts.

* * * * *